US011241978B2

(12) United States Patent
Da Silva et al.

(10) Patent No.: US 11,241,978 B2
(45) Date of Patent: Feb. 8, 2022

(54) PASSENGER TRANSPORT SEATS WITH LATERAL SEAT LIPS

(71) Applicant: EMBRAER S.A., São José dos Campos (BR)

(72) Inventors: Valdair Nadiel Da Silva, São José dos Campos (BR); Paula Azevedo Macedo, São José dos Campos (BR); Flavia Renata Dantas Alves Silva Ciaccia, São José dos Campos (BR); Rodrigo Takashi Lourenco Kawasaki, São José dos Campos (BR); Leonardo Marindo De Souza, São José dos Campos (BR); Julio Cesar Graves, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 0 days.

(21) Appl. No.: 16/897,662

(22) Filed: Jun. 10, 2020

(65) Prior Publication Data

US 2020/0384894 A1 Dec. 10, 2020

Related U.S. Application Data

(60) Provisional application No. 62/859,421, filed on Jun. 10, 2019.

(51) Int. Cl.
*B60N 2/02* (2006.01)
*B60N 2/885* (2018.01)
*A47C 1/023* (2006.01)
*B60N 2/90* (2018.01)
*B60N 2/28* (2006.01)

(52) U.S. Cl.
CPC .............. *B60N 2/02* (2013.01); *A47C 1/023* (2013.01); *B60N 2/2872* (2013.01); *B60N 2/885* (2018.02); *B60N 2/986* (2018.02); *B60N 2/99* (2018.02); *B60N 2002/0288* (2013.01)

(58) Field of Classification Search
CPC .... B60N 2002/0288; B60N 2/99; B60N 2/02; B60N 2/986; B60N 2/2872; B60N 2/885; A47C 1/023
See application file for complete search history.

(56) References Cited

U.S. PATENT DOCUMENTS

| 137,062 | A | * | 3/1873 | Croghen | A47C 17/12 297/117 |
|---|---|---|---|---|---|
| 2,509,551 | A | * | 5/1950 | Woods | A61G 5/1002 297/236 |
| 2,621,708 | A | * | 12/1952 | Luce, Jr. | B60N 2/3018 297/117 |

(Continued)

*Primary Examiner* — Syed A Islam
(74) *Attorney, Agent, or Firm* — Nixon & Vanderhye P.C.

(57) ABSTRACT

Seat assemblies are provided which include a seat base structure, a seat cushion supported by the seat base structure and at least a lateral outboard seat lip positioned relative to the seat cushion so as to assist a passenger during seat entry and exit. The lateral outboard seat lip is preferably attached relative to the seat cushion for manual movements between an extended position wherein the outboard seat lip extends outwardly thereby increasing effective surface area of the seat cushion and a deflected position wherein the outboard seat lip extends upwardly or downwardly relative to the seat cushion so as to thereby decrease the effective surface area of the seat cushion.

18 Claims, 3 Drawing Sheets

(56) References Cited

U.S. PATENT DOCUMENTS

Figure 1:
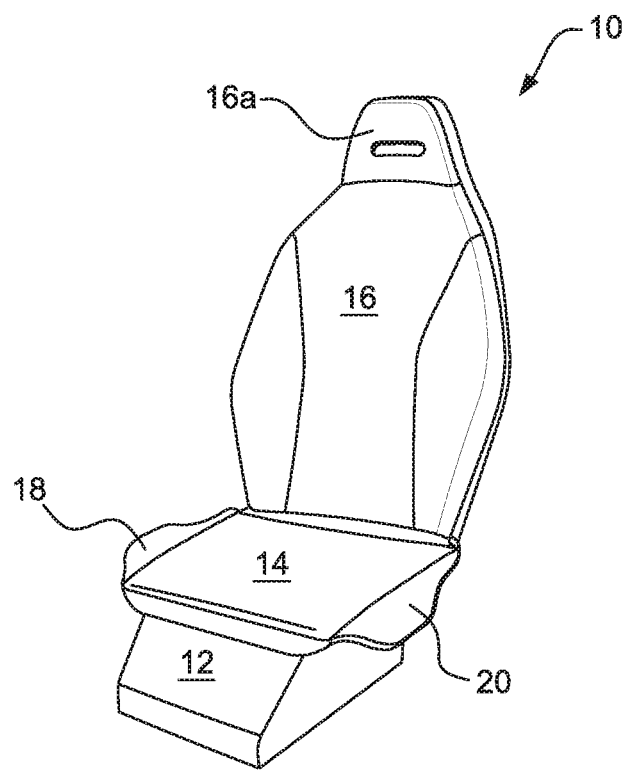

| | | | | |
|---|---|---|---|---|
| 4,155,588 | A * | 5/1979 | Danziger | A61G 5/00 297/115 |
| 4,455,046 | A | 6/1984 | Linderoth | |
| 4,496,189 | A * | 1/1985 | Tanizaki | A47C 1/023 297/112 |
| 5,384,946 | A * | 1/1995 | Sundstedt | B60N 2/3084 297/117 |
| 6,672,666 | B2 * | 1/2004 | Stiller | B60N 2/58 297/284.2 |
| 7,093,904 | B1 * | 8/2006 | McMillen | A47C 1/0308 297/411.37 |
| 7,578,551 | B2 * | 8/2009 | Linero | A47C 1/122 297/107 |
| 7,607,735 | B2 * | 10/2009 | Kuno | B60N 2/0232 297/284.6 |
| 7,770,966 | B2 | 8/2010 | Johnson | |
| 7,980,617 | B2 * | 7/2011 | Brncick | B60N 2/01 296/64 |
| 8,118,359 | B2 * | 2/2012 | Kyogoku | B60N 2/3038 297/105 |
| 8,123,296 | B2 * | 2/2012 | Rager | B60N 2/99 297/284.3 |
| 8,251,427 | B2 * | 8/2012 | Lindsay | B60N 2/062 296/65.11 |
| 8,496,290 | B2 * | 7/2013 | Maier | B60N 2/3009 297/112 |
| 9,586,686 | B2 * | 3/2017 | Asli | B60N 2/02 |
| 9,693,634 | B2 * | 7/2017 | Smith | A47C 7/14 |
| 10,245,982 | B2 * | 4/2019 | Khalid | B60N 2/3025 |
| 10,259,343 | B2 * | 4/2019 | Cengil | B60N 2/0224 |
| 10,427,552 | B2 * | 10/2019 | Guy | B60N 2/58 |
| 10,703,225 | B2 * | 7/2020 | Ito | B60N 2/0232 |
| 10,829,020 | B2 * | 11/2020 | Welch | B60N 3/101 |
| 2002/0089220 | A1 * | 7/2002 | Achleitner | B60N 2/99 297/284.9 |
| 2007/0052264 | A1 * | 3/2007 | Lee | B60N 2/3084 297/188.04 |
| 2013/0147240 | A1 | 6/2013 | Lee | |
| 2019/0184870 | A1 | 6/2019 | Clark et al. | |
| 2020/0031251 | A1 * | 1/2020 | Bocchino | B60N 2/995 |

* cited by examiner

PASSENGER TRANSPORT SEATS WITH LATERAL SEAT LIPS

CROSS-REFERENCE TO RELATED APPLICATION

This application is based on and claims domestic priority benefits from U.S. Provisional Application Ser. No. 62/859,421 filed on Jun. 10, 2019, the entire contents of which are expressly incorporated hereinto by reference.

FIELD

The embodiments disclosed herein relate generally to seats, preferably seats for passenger transport vehicles. In certain embodiments, the seats have a bottom cushion which comprises at least one seat lip positioned on at least one lateral side of seat the cushion. The lateral seat lip supports the passenger's body during boarding phases or avoids contact with a passenger seated on an adjacent seat. The seats according to the embodiments disclosed herein are especially useful for transport vehicles having a relatively high distance from the ground (e.g., aircraft cabins and vehicle interiors associated with other public or private modes of transport such as busses, trains and automobiles) and can provide passengers with a sense of comfort and privacy in relatively small vehicle interiors as well as easier entry onto and exit from the seat.

BACKGROUND

In recent years there has been an increase of ridesharing vehicles in large urban areas. The riders inside the same vehicle do not always know each other, leveraging the necessity of creating an environment that affords a concurrent sense of privacy and socialization. The lack of privacy due to "living space" squeeze is a common complaint from riders as people tend to invade the space of others which exacerbates the perception that the space is even smaller. In extreme cases, passenger discomfort can cause ride disruptions and conflicts among passengers.

Another important point to address when considering urban mobility is the means to provide easy access to people with disabilities or reduced mobility. Depending upon the vehicle, the difference in height between, for example, a wheelchair and the top seating surface could be more difficult to allow rider transfer onto and from the vehicle thereby requiring external support during such transfer activities.

There exists in this art some previous proposals that are directed toward solutions to the challenges imposed by vehicular transport of passengers as evidenced, for example, by U.S. Pat. No. 4,455,046, US2013/0147240, US2019/0184870 and U.S. Pat. No. 7,770,966 (the entire contents of each such document being expressly incorporated hereinto by reference). However, a human-driven approach that addresses the variety of human shapes and behaviors is still lacking in conventional seat designs and implementations.

It would therefore be highly desirable if vehicle seats were both comfortable and more easily allowed entry into and exit out of the seat yet provide a sense of individual privacy when needed. It is towards providing such improvements to passenger transport seats that the embodiments disclosed herein are directed.

SUMMARY

The embodiments disclosed herein generally relate to seat assemblies having a seat base structure, a seat cushion supported by the seat base structure and a lateral outboard seat lip positioned relative to the seat cushion so as to assist a passenger during seat entry and exit. The lateral outboard seat lip is preferably attached relative to the seat cushion for manual movements between an extended position wherein the outboard seat lip extends outwardly thereby increasing effective surface area of the seat cushion and a deflected position wherein the outboard seat lip extends upwardly or downwardly relative to the seat cushion so as to thereby decrease the effective surface area of the seat cushion.

According to certain embodiments, the seat assemblies will include a lateral inboard seat lip positioned relative to the seat cushion opposite of the outboard seat lip. The inboard seat lip may be in a fixed-position so as to be upwardly deflected relative to the top seat surface of the seat cushion (thereby providing lateral inboard thigh support to a passenger occupying the seat assembly), or may be movable in a similar manner to the outboard set lip between extended and upwardly/downwardly deflected positions.

The seat assemblies may be positioned within an interior cabin of a vehicle in a side-by-side arrangement. According to some embodiments, the side-by-side arrangement of seat assemblies may include a fixed-position common inboard seat lip conjointly extending between each of the seat assemblies. The common inboard seat lip is preferably elevated relative to top seating surfaces of the seat cushions of the adjacent seat assemblies and may additionally be inclined upwardly from a front end thereof toward an aft end thereof.

These and other aspects and advantages of the embodiments of the present invention disclosed herein will become more clear after careful consideration is given to the following detailed description of the preferred exemplary embodiments thereof.

BRIEF DESCRIPTION OF ACCOMPANYING DRAWINGS

Figure 2:
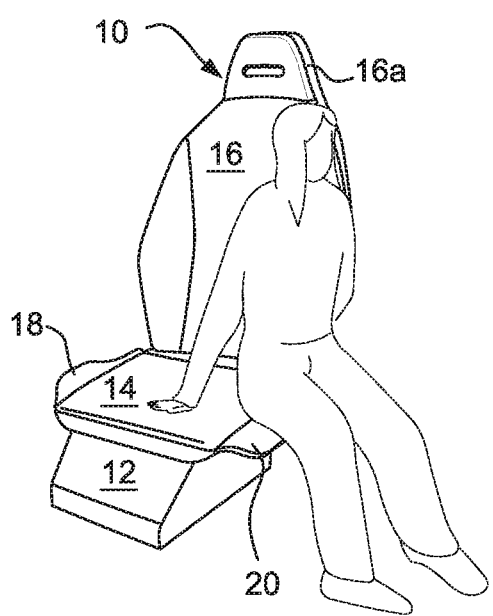
Figure 3:
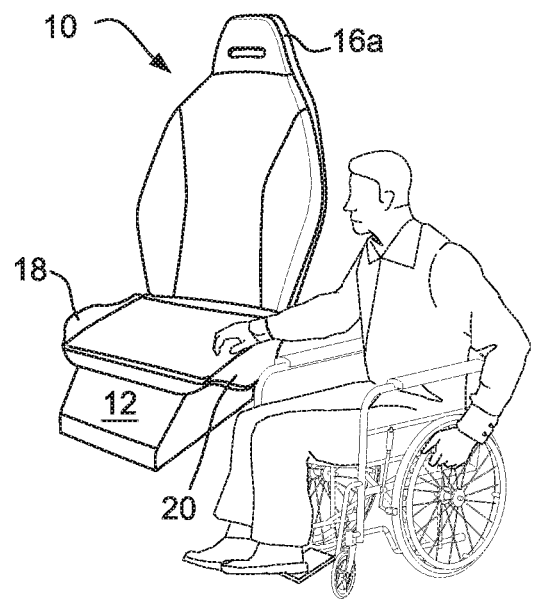
Figure 4:
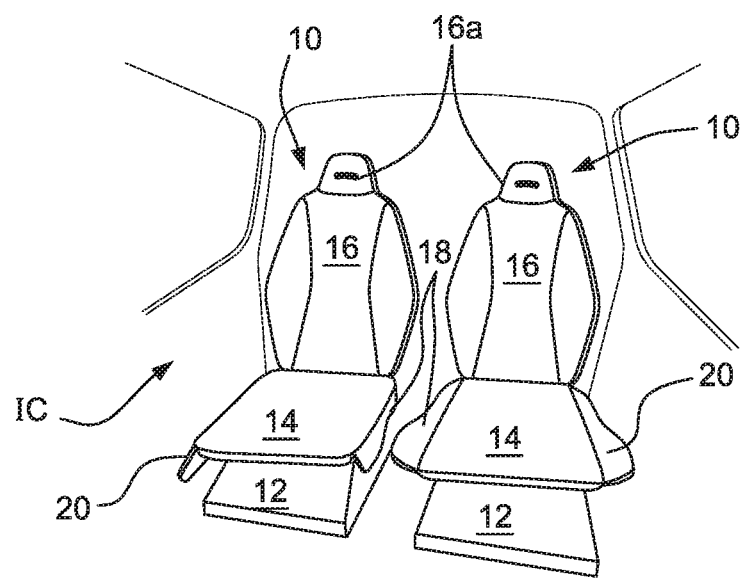
Figure 5:
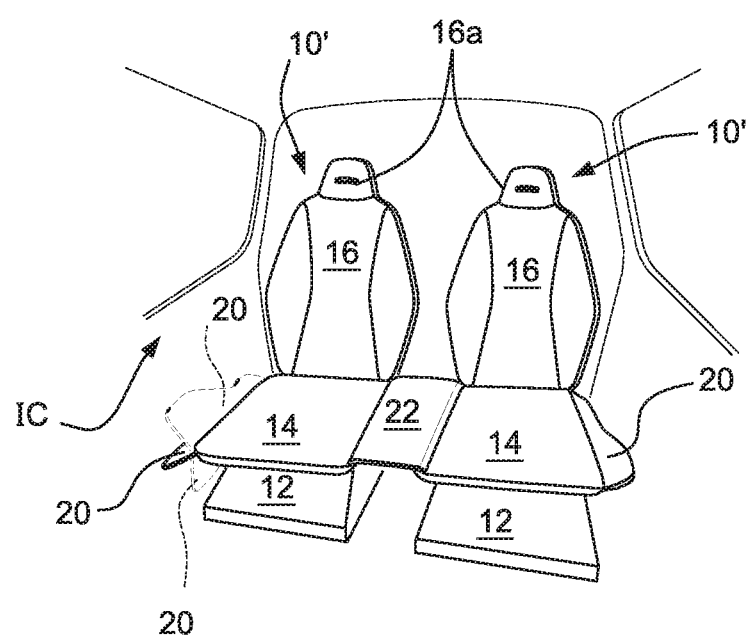

The disclosed embodiments of the present invention will be better and more completely understood by referring to the following detailed description of exemplary non-limiting illustrative embodiment in conjunction with the drawings of which:

FIG. 1 is a front perspective view of a vehicle seat which includes lateral seat lips in accordance with an embodiment of the invention;

FIG. 2 is a front perspective view of the vehicle seat depicted in FIG. 1 schematically showing a passenger exiting the vehicle with assistance provided by the outboard seat lip when in the retracted position; and FIG. 3 is a front perspective view of the vehicle seat depicted in FIG. 1 schematically showing a passenger using a wheel chair when boarding the vehicle with assistance provided by the outboard seat lip when in the extended position;

FIG. 4 is an interior perspective view of a vehicle interior (e.g., an aircraft cabin) as viewed aftward showing a side-by-side arrangement of a seat assembly which includes a pair of individual vehicle seats depicted in FIG. 1; and FIG. 5 is an interior perspective view of a vehicle interior (e.g., an aircraft cabin) as viewed aftward showing another embodiment of a bench-style seat assembly according to the invention wherein each of the outboard lateral edges of the seat assembly include a lateral seat lip;

DETAILED DESCRIPTION

An exemplary embodiment of a vehicle seat assembly 10 that is especially adapted for use in a transport vehicle is depicted in FIGS. 1-3 as including a base structure 12 which supports a seat bottom cushion 14. The seat assembly 10 will conventionally have a seat backrest cushion 16 extending upwardly from a rear part of the seat cushion 14 which may terminate at its upper end in an integral headrest 16a. As conventional, the headrest 16a may itself be positionable as desired by the passenger occupying the seat 10. The functions of seat bottom cushion 14 and the seat backrest cushion 16 are principally to support the body weight of a passenger occupying the seat assembly 10 and to provide comfort to the passenger during use. The seat bottom cushion 14 and the seat backrest cushion 16 may, for example, be constructed of foam, gel, high performance textiles, air bladders or combinations thereof.

The principal function of seat base structure 12 is to provide necessary structural support to entire seat assembly 10 and thus comprises all the structures necessary to dynamically support seat loads. The structures supporting the seat bottom cushion 14 and the backrest cushion 16 are thereby structurally attached to the seat base structure 12. The seat base structure 2 can have different structural forms in conformity with seat assembly 10 and can be, for example, either floor mounted or wall mounted in the vehicle as may be required. Thus, by way of example, the base structure may be symmetrically positioned below the base structure 12 or as shown in FIG. 1 asymmetrically off-set in an inboard direction of the vehicle (e.g., in the manner depicted in pending U.S. application Ser. No. 29/665,617 filed on Oct. 5, 2018 (the entire content of which is expressly incorporated hereinto by reference) in which the seat 10 is positioned so as to further assist a passenger during entry/exit of the vehicle.

Important to the embodiments disclosed herein is the provision of moveable inboard and outboard seat lips 18, 20, respectively. The inboard lip 18 is provided for comfort and privacy, especially in relatively small vehicle interior spaces. When fixed or moved into an upwardly deflected position as shown in FIG. 1, the inboard lip 18 defines a surface that creates a lateral thigh support and prevents the passenger's body seated in the seat assembly 10 from physically touching another passenger's body seated in an adjacent seat. The outboard lip 20 is provided to allow for easier and safer access to the vehicle, especially for vehicles with an increased distance between the seat bottom cushion 14 and the floor that may be higher than the passenger's popliteal height or when it is necessary to transfer to the seat assembly 10 by non-ambulatory passenger, e.g., a person using wheelchair.

Each of the inboard lip 18 and outboard lip 20 is preferably comprised of a rigid lip structure made from composite material, plastic material, metallic material or the like and a lip body support system made from a flexible material such as foam, gel or air bladders or combination thereof that support an occupant's body. An optional external layer, e.g., of upholstery that finishes the surface of each of the seat lips 18, 20 may be provided so as to be in contact with the passenger's body when seated on the seat assembly 10.

The inboard seat lip 18 and outboard seat lip 20 are preferably physically fastened to base structure 12 adjacent to bottom cushion 14 by suitable support structures (not shown). Alternatively, the inboard and outboard seat lips 18, 20 may be an integral part of the seat cushion 14 itself or be installed in the other components of the seat or the vehicle, such as the vehicle floor and wall. The structures forming the inboard and outboard seat lips 18, 20 may therefore be part of seat base structure 12 or a separate part mounted on the seat base structure 12 or installed in the other component of the seat or the vehicle, such as floor and wall.

The inboard and outboard seat lips 18, 20 will include a structural mechanism or have at least a hinge junction with the seat cushion 14 be made of a flexible material in order to allow the seat lips 18, 20 to be manually moved relative to the bottom seat cushion 14 between an extended position and upwardly/downwardly deflected (retracted) positions relative to the seat cushion 12. When in the extended position, the outboard seat lip 20 will be an essentially horizontal extension of the bottom cushion 14 so as to increase the effective surface area of the seat cushion 12. Such increased effective surface area of the seat cushion 14 provided by the outboard seat lip 20 in an extended position will thereby allow certain passengers who may occupy the seat assembly to more easily transfer from the seat cushion 12 to, e.g., a wheelchair, as is depicted in FIG. 2 since the extended seat lip 20 will provide additional lateral support for the passenger when exiting the vehicle. Conversely, when the outboard seat lip 20 is in a downwardly deflected (retracted) position as is shown by FIG. 3, a wheelchair bound passenger may more easily board the vehicle and assume a seated position on the seat cushion 12 since the effective top seating surface area of the seat cushion 12 will have been decreased to allow more easy ingress to the interior passenger cabin.

As is shown in FIG. 4, the seat assembly 10 may be employed in use within an interior cabin IC of a transport vehicle in cooperation with a similarly configured seat assembly 10 as shown in FIG. 4 in which case the inboard and outward seat lips 18, 20 of each seat assembly 10 are in mirror image positions relative to one another.

An alternative embodiment of side-by-side seat assemblies 10' is depicted in FIG. 5. As shown, each of the seat assemblies 10' is substantially identical to the seat assemblies 10 described hereinabove in relationship to FIGS. 1-4 and as such the same reference numerals have been employed to identified identical structural elements therebetween. Thus, the seat assemblies 10' shown in FIG. 5 will each include outboard seat lips 20 that are moveable between an extended position (i.e., as shown by the solid lines in FIG. 5 for the outboard seat lip 20 associated with the starboard side seat assembly 10) and upwardly and downwardly deflected (retracted) positions (i.e., as shown by the dashed lines in FIG. 5 for the outboard seat lip 20 associated with the starboard side seat assembly 10). However, rather than the corresponding inboard seat lips 18 associated with the seat assemblies 10, the seat assemblies 10' will include a common inboard fixed-position seat lip 22 conjointly spanning the adjacent seat cushions 14.

The common inboard fixed-position seat lip 22 will preferably be elevated somewhat as compared to the surface of the adjacent seat cushions 14 to thereby provide each respective passenger seated in the seat assemblies 10' a sense of physical privacy (e.g., by providing lateral thigh support for the passenger occupying the seat assembly 10').

As is shown in FIG. 5, the common inboard fixed-position seat lip 22 may be inclined in an aft-wise direction so that the forward end portion thereof is at substantially the same elevation as the surface of the seat cushions 14 yet increases in elevation gradually toward the rear end thereof so as to be at a noticeably greater elevation as compared to the surface of the seat cushions 14. Such an arrangement is especially advantageous in the event the transport vehicle has a single entry door thereby making it necessary for one of the passengers to move laterally across the seat lip 22 during vehicle entry/exit.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A seat assembly comprising:
   a seat base structure;
   a seat cushion supported by the seat base structure which defines a top seating surface; and
   a lateral outboard seat lip positioned relative to the seat cushion so as to assist a passenger during seat entry and exit, wherein
   the lateral outboard seat lip is attached relative to the seat cushion for manual movements between (i) an outboard extended position wherein the outboard seat lip extends essentially horizontally outwardly of the seat cushion to thereby provide an essentially horizontal extension of the seat cushion to increase an effective surface area of the top seating surface, (ii) an outboard upwardly inclined deflected position wherein the outboard seat lip extends upwardly and outwardly relative to the top seating surface of the seat cushion to provide a lateral thigh support for an occupant seated on the top seating surface of the seat cushion, and (iii) an outboard downwardly inclined deflected position wherein the outboard seat lip extends downwardly and outwardly relative to the top seating surface of the seat cushion so as to thereby decrease the effective surface area of the top seating surface and allow an occupant to more easily be seated on the top seating surface of the seat cushion.

2. The seat assembly according to claim 1, which further comprises a lateral inboard seat lip positioned relative to the seat cushion opposite of the outboard seat lip.

3. The seat assembly according to claim 2, wherein the inboard seat lip is in a fixed-position so as to be upwardly deflected relative to the top seating surface of the seat cushion.

4. The seat assembly according to claim 2, wherein the lateral inboard seat lip is attached relative to the seat cushion for manual movements between (i) an inboard extended position wherein the inboard seat lip extends essentially horizontally outwardly from the top seat surface of the seat cushion thereby increasing the effective surface area of the top seat surface of the seat cushion, (ii) an inboard upwardly inclined deflected position wherein the inboard seat lip extends upwardly and outwardly relative to the top seat surface of the seat cushion, and (iii) an inboard downwardly inclined deflected position wherein the inboard seat lip extends downwardly and outwardly relative to the top seat surface of the seat cushion.

5. The seat assembly according to claim 2, wherein each of the inboard and outboard seat lips is attached to the seat base structure.

6. The seat assembly according to claim 2, wherein each of the inboard and outboard seat lips is integral with the seat cushion.

7. The seat assembly according to claim 1, further comprising a seat back connected to the seat base structure and upwardly extending from the seat cushion.

8. The seat assembly according to claim 7, wherein the seat back comprises a head rest.

9. A vehicle which comprises the seat assembly according to claim 1.

10. A seating arrangement which comprises a set of seat assemblies according to claim 1 positioned in side-by-side relationship.

11. The seating arrangement according to claim 10, wherein the lateral outboard seat lip of each seat assembly is attached relative to the seat cushion for manual movements between (i) the outboard extended position, (ii) the outboard upwardly inclined deflected position, and (iii) the outboard downwardly inclined deflected position.

12. The seating arrangement according to claim 10, which wherein each seat assembly further comprises a lateral inboard seat lip positioned relative to the seat cushion opposite of the outboard seat lip.

13. The seating arrangement according to claim 12, wherein the inboard seat lip is in a fixed-position so as to be upwardly deflected relative to a top seating surface of the seat cushion.

14. The seating arrangement according to claim 12, wherein the lateral inboard seat lip is attached relative to the seat cushion for manual movements between (i) an inboard extended position wherein the inboard seat lip extends essentially horizontally outwardly thereby increasing the effective surface area of the top seat surface of the seat cushion, (ii) an inboard upwardly inclined deflected position wherein the inboard seat lip extends upwardly and outwardly relative to the top seat surface of the seat cushion, and (iii) an inboard downwardly inclined deflected position wherein the inboard seat lip extends downwardly and outwardly relative to the top seat surface of the seat cushion.

15. The seating arrangement according to claim 10, which further comprises a fixed-position common inboard seat lip conjointly extending between each of the seat assemblies.

16. The seating arrangement according to claim 15, wherein the common inboard seat lip is elevated relative to top seating surfaces of the seat cushions of the seat assemblies.

17. The seating arrangement according to claim 16, wherein the common inboard seat lip is inclined upwardly from a front end thereof toward an aft end thereof.

18. A vehicle which comprises the seating arrangement according to claim 10.

* * * * *